(12) United States Patent
Kim

(10) Patent No.: US 7,203,516 B2
(45) Date of Patent: Apr. 10, 2007

(54) MULTI-FUNCTIONAL MOBILE TERMINAL FOR INDEPENDENTLY OPERATING HETEROGENEOUS DEVICES AND METHOD FOR EXECUTING INDEPENDENT OPERATION USING THE SAME

(75) Inventor: Seon-Mi Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 271 days.

(21) Appl. No.: 10/752,394

(22) Filed: Jan. 6, 2004

(65) Prior Publication Data
US 2004/0142725 A1 Jul. 22, 2004

(30) Foreign Application Priority Data
Jan. 6, 2003 (KR) .................. 10-2003-0000588

(51) Int. Cl.
*H04M 11/00* (2006.01)
*G09G 5/00* (2006.01)
*G08B 5/22* (2006.01)
(52) U.S. Cl. .................. 455/556.1; 345/179; 340/7.32
(58) Field of Classification Search .. 455/556.1–556.2, 455/574, 557, 572, 90, 66, 550.1, 575.1, 455/90.3, 555.2, 96; 345/179; 340/7.32, 340/7.2
See application file for complete search history.

(56) References Cited

U.S. PATENT DOCUMENTS

| | | | | |
|---|---|---|---|---|
| 6,233,464 | B1 * | 5/2001 | Chmaytelli | 455/556.2 |
| 6,384,626 | B2 * | 5/2002 | Tsai et al. | 326/38 |
| 6,725,060 | B1 * | 4/2004 | Chhatriwala et al. | 455/556.2 |
| 2004/0121802 | A1 * | 6/2004 | Kim et al. | 455/556.2 |

* cited by examiner

*Primary Examiner*—Naghmeh Mehrpour
(74) *Attorney, Agent, or Firm*—The Farrell Law Firm

(57) ABSTRACT

A multi-functional mobile terminal for independently operating heterogeneous devices, including a power-supply unit for selectively providing a power-supply signal for a corresponding module according to a power-supply entry signal; a personal information terminal module for executing a corresponding operation using the power-supply signal received from the power-supply unit, containing a first display, and controlling the first display to display status information of the executed operation; a mobile terminal module for executing a corresponding operation using the power-supply signal received from the power-supply unit, executing a corresponding operation after receiving a prescribed command, and displaying operation status information on a second display in a powered-off state; and a module selector for controlling a power-supply operation of the power-supply unit to selectively provide the power-supply signal for either the personal information terminal module or the mobile terminal module.

19 Claims, 5 Drawing Sheets

MULTI-FUNCTIONAL MOBILE TERMINAL FOR INDEPENDENTLY OPERATING HETEROGENEOUS DEVICES AND METHOD FOR EXECUTING INDEPENDENT OPERATION USING THE SAME

BACKGROUND OF THE INVENTION

1. Field of the Invention

The present invention relates generally to a multi-functional mobile terminal with a mobile phone function, and more particularly to a multi-functional mobile terminal for incorporating a mobile phone module and a PDA (Personal Digital Assistant) module for storing information and searching for information on Internet in one manufactured product. The mobile phone module and the PDA module are provided with individual power-supply voltages, respectively, and thereby operate independently of each other.

2. Description of the Related Art

Typically, a PDA (Personal Digital Assistant) is a general term for palm-sized devices for personal and business use, mainly used to perform calculation, searching for or storing of necessary information therein. Also, the PDA has been widely used to manage schedule, calendar, and address book information. Such a PDA has been called a kind of pocket-sized computer, for example, Palmtop manufactured by HP (Hewlett-Packard) Company, and Palmpilot manufactured by 3Com Corporation.

Most PDAs contain a small-sized keyboard for receiving commands from users. However, some PDAs may contain an electromagnetic pad for sensing commands written by a prescribed character entry means such as a user's body and a touch pen. The PDA has been widely used to store/search for schedule and address book information, and enable a user to enter a desired memorandum therein. Recently, with the increasing development of many application programs for such a PDA, a multi-functional mobile terminal for incorporating a mobile phone module and a pager module in one body is now being produced on a commercial scale.

FIG. 1 is a view illustrating a block diagram of a conventional multi-functional mobile terminal incorporated with a mobile phone module and a PDA module in one body. Referring to FIG. 1, a conventional multi-functional mobile terminal 10 includes a mobile phone module 20 for executing a mobile phone function and a PDA module 30 for executing a PDA function.

The mobile phone module 20 includes a sub-microcomputer (Sub-MICOM) 22 for controlling overall operations of the mobile phone functions. The PDA module 30 includes a main microcomputer (Main-MICOM) 34 for controlling overall operations of the PDA functions. The PDA module 30 further includes an LCD (Liquid Crystal Display) 32 for displaying operation states of the multi-functional mobile terminal 10. A representative example of the sub-MICOM 22 is an MSM (Mobile Station Modem) manufactured by Qualcomm Company, and a representative example of the Main-MICOM 34 is the 'Dragoon boll' manufactured by the Palm Company. The sub-MICOM 22 and the main-MICOM 34 are interconnected over an interface 42, and thereby mutually controlled via the interface 42.

The main-MICOM 34 senses an operation status of the PDA module 30 and an operation status transmitted from the sub-MICOM 22 of the mobile phone module 20, and displays the operation statuses on the LCD 32. The multi-functional mobile terminal 10 further includes a power-supply unit 40 for selectively providing a power-supply voltage for either the mobile phone module 20 or the PDA module 30 according to the type of entry signal. Therefore, if a user only wants to use functions of the mobile phone module 20 in the multi-functional mobile terminal 10, the power-supply unit 40 provides only the mobile phone module 20 with a power-supply voltage by the use of a power-supply selection switch (not shown) mounted on the multi-functional mobile terminal 10. Otherwise, if the user only wants to use functions of the PDA module 30 in the multi-functional mobile terminal 10, the power-supply unit 40 provides only the PDA module 30 with a power-supply voltage by the use of such a power-supply selection switch (not shown).

However, the main-MICOM 34 of the PDA module 30 manages a user interface for displaying operation states of the PDA module 30 and the mobile phone module 20 and controlling other functions thereof. Therefore, the conventional multi-functional mobile terminal 10 can support the user interface by the use of the main-MICOM 34 without powering on or off the mobile phone module 20. In more detail, if the mobile phone module 20 is powered off and the PDA module 30 is powered on to activate only the PDA module 30, a variety of operation states of the PDA module 30 are displayed on the LCD 32 upon receiving a control signal from the main-MICOM 34 of the PDA module 30, in such a way that the conventional multi-functional mobile terminal is able to support the user interface. However, if the mobile phone module 20 is powered on and the PDA module 30 is powered off to active only the mobile phone module 20, the main-MICOM 34 is powered off, such that operation states of the mobile phone module 20 are not displayed on the LCD 32, resulting in an ineffective user interface.

Therefore, even when the user attempts to activate only the mobile phone module 20 without activating the PDA module 30 in the conventional multi-functional mobile terminal 10, it must power on the PDA module 30 along with the mobile phone module 20, resulting in an increase of power consumption much higher than an actually necessary power consumption level of the multi-functional mobile terminal 10.

The conventional multi-functional mobile terminal 10 allows the main-MICOM 34 of the PDA module 30 to control such a user interface. Therefore, although there occurs an error in the operations of the PDA module 30, the mobile phone module 20 under normal operation does not correctly display its own operation status on the LCD 32 because of an operation failure of the main-MICOM 34, such that the user must always reset the multi-functional mobile terminal 10 whenever there occurs an error in the operations of the PDA module 30, resulting in the increase of a user's inconvenience.

SUMMARY OF THE INVENTION

Therefore, the present invention has been designed in view of the above and other problems, and it is an object of the present invention to provide a multi-functional mobile terminal, which incorporates heterogeneous devices having different functions and controllers (i.e., microcomputers) in one body, and for independently executing one of the heterogeneous devices' functions, as well as a method for independently controlling operations of the same.

It is another object of the present invention to provide a multi-functional mobile terminal incorporated with heterogeneous devices in one body, for independently providing a user with a user interface of one device from among the heterogeneous devices when only that one device from among the heterogeneous devices is activated, and a method for independently controlling operations of the same.

In accordance with one aspect of the present invention, the above and other objects can be accomplished by a multi-functional mobile terminal with a phone function comprising: a power-supply unit for selectively providing a power-supply signal for a corresponding module according to a power-supply entry signal; a personal information terminal module (including a first display with a first LCD (Liquid Crystal Display) therein) for executing a corresponding operation according to an entry command using the power-supply signal received from the power-supply unit, and controlling the first display to display status information of the executed operation on the first. LCD; a mobile terminal module including a second display with a second LCD therein, for executing a corresponding operation according to an entry command using the power-supply signal received from the power-supply unit, executing a corresponding operation according to a prescribed command after receiving the prescribed command from the personal information terminal module, and displaying operation status information on the second LCD of the second display in a powered-off state of the personal information terminal module and a module selector for controlling a power-supply operation of the power-supply unit to selectively provide the power-supply signal for one of the personal information terminal module and the mobile terminal module.

Preferably, if the power-supply signal is applied to the personal information terminal module, the mobile terminal module updates data having been changed and/or added by operations of the mobile terminal module in a powered-off state of the personal information terminal module, and stores the updated data into the personal information terminal module, thereby establishing synchronization with the personal information terminal module.

Preferably, the mobile terminal module includes a plurality of keys for entering prescribed commands to independently operate the mobile terminal module in a powered-off state of the personal information terminal module. Therefore, if one of the keys is selected, the second display may display the mobile terminal module's operation status information corresponding to the selected key on the second LCD. In this case, the personal information terminal module may be a PDA (Personal Digital Assistant) module, and the mobile terminal module may be a mobile phone module In accordance with another aspect of the present invention, there is provided a multi-functional mobile terminal with a phone function comprising: a power-supply unit for selectively providing an external power-supply signal for a corresponding device according to an entry signal, a display for displaying operation status information of an external device executing a corresponding operation according to an entry command on an LCD using the power-supply signal received from the power-supply unit; a personal information terminal module for displaying the operation status information received from the external device and self-operation status information on the LCD using the power-supply signal received from the power-supply unit; a mobile terminal module for executing an operation corresponding to a prescribed command of the personal information terminal module using the power-supply signal received from the power-supply unit after receiving the prescribed command from the personal information terminal module, and displaying self-operation status information on the LCD in a powered-off state of the personal information terminal module; and a module selector for controlling a power-supply operation of the power-supply unit to selectively provide the power-supply signal for one of the personal information terminal module and the mobile terminal module.

Preferably, if the power-supply signal is applied to the personal information terminal module, the mobile terminal module updates data having been changed and/or added by operations of the mobile terminal module in a powered-off state of the personal information terminal module, and stores the updated data into the personal information terminal module, thereby establishing synchronization with the personal information terminal module.

Preferably, the mobile terminal module includes a command entry section for entering prescribed commands to independently operate the mobile terminal module in a powered-off state of the personal information terminal module. Therefore, if the command entry section is selected, the mobile terminal module displays the mobile terminal module's operation status information corresponding to the selected command on the LCD.

In accordance with yet another aspect of the present invention, there is provided a method for controlling independent operations using a multi-functional mobile terminal incorporated with a personal information terminal module and a mobile terminal module in one body, in which the personal information terminal module and the mobile terminal module respectively receive a power-supply signal for executing their independent operations, said method comprising the steps of: if the power-supply signal is applied to the personal information terminal module and the mobile terminal module, determining whether a command for powering off the personal information terminal module is received; if the command for powering off the personal information terminal module is received, powering off the personal information terminal module; executing a corresponding operation of the mobile terminal module according to an entry command in a powered-off state of the personal information terminal module, and displaying operation status information accompanied with the executed operation of the mobile terminal module; if the mobile terminal module is independently operated, determining whether a command for powering on the personal information terminal module is received; if the command for powering on the personal information terminal is received, powering on the personal information module; and updating data changed and/or added by operations of the mobile terminal module in a powered-off state of the personal information terminal module, and storing the updated data into the personal information terminal module.

Preferably, the mobile terminal module independently executes its own operations in a powered-off state of the personal information terminal module, and displays status information of the executed operations on its own LCD, such that self-operation and operation status information can be displayed using only the mobile terminal module. Also, the personal information terminal module and the mobile terminal module independently execute their own operations, and display current status information of their executed operations on their own LCDs, respectively, so that a user inlay power off a power-supply voltage transmitted to an unused module from among the personal information terminal module and the mobile terminal module, thereby reducing power consumption.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
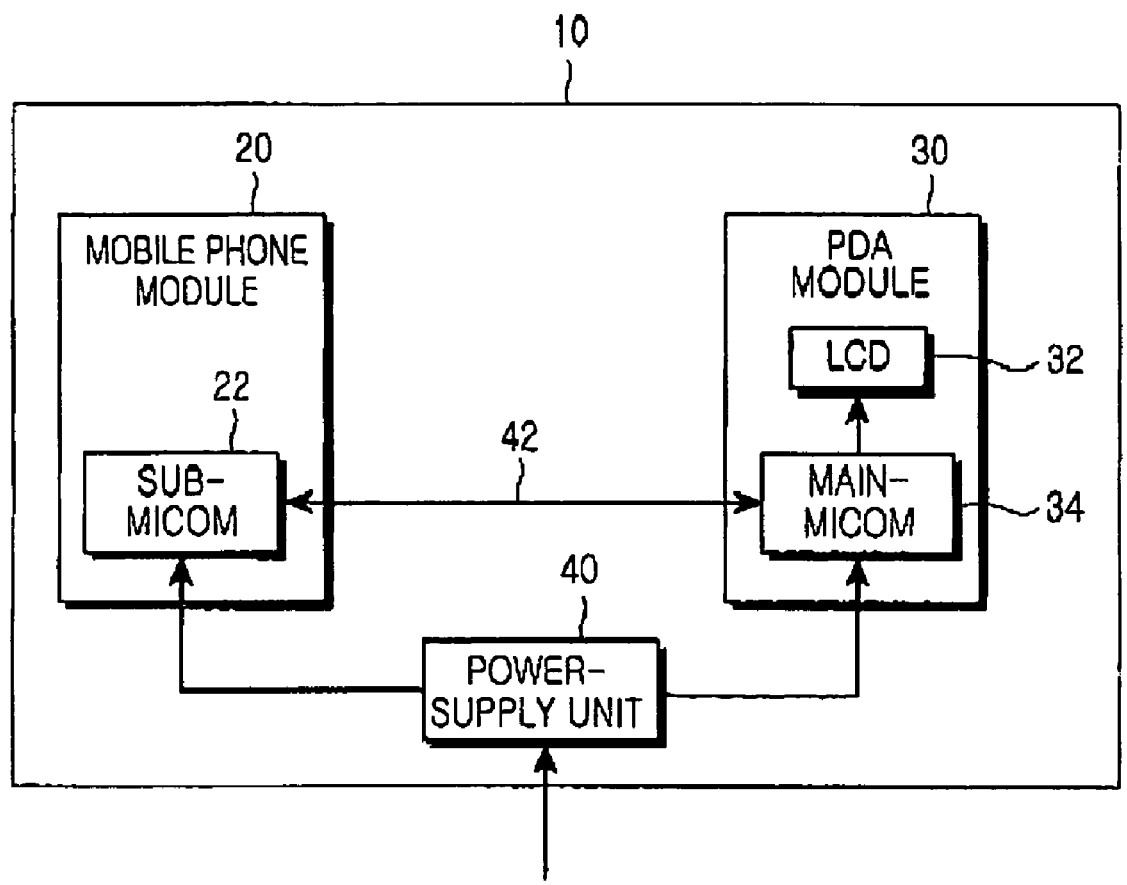
FIG. 1 is schematic diagram of a conventional multi-functional mobile terminal incorporated with a mobile phone module and a PDA module in one body.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
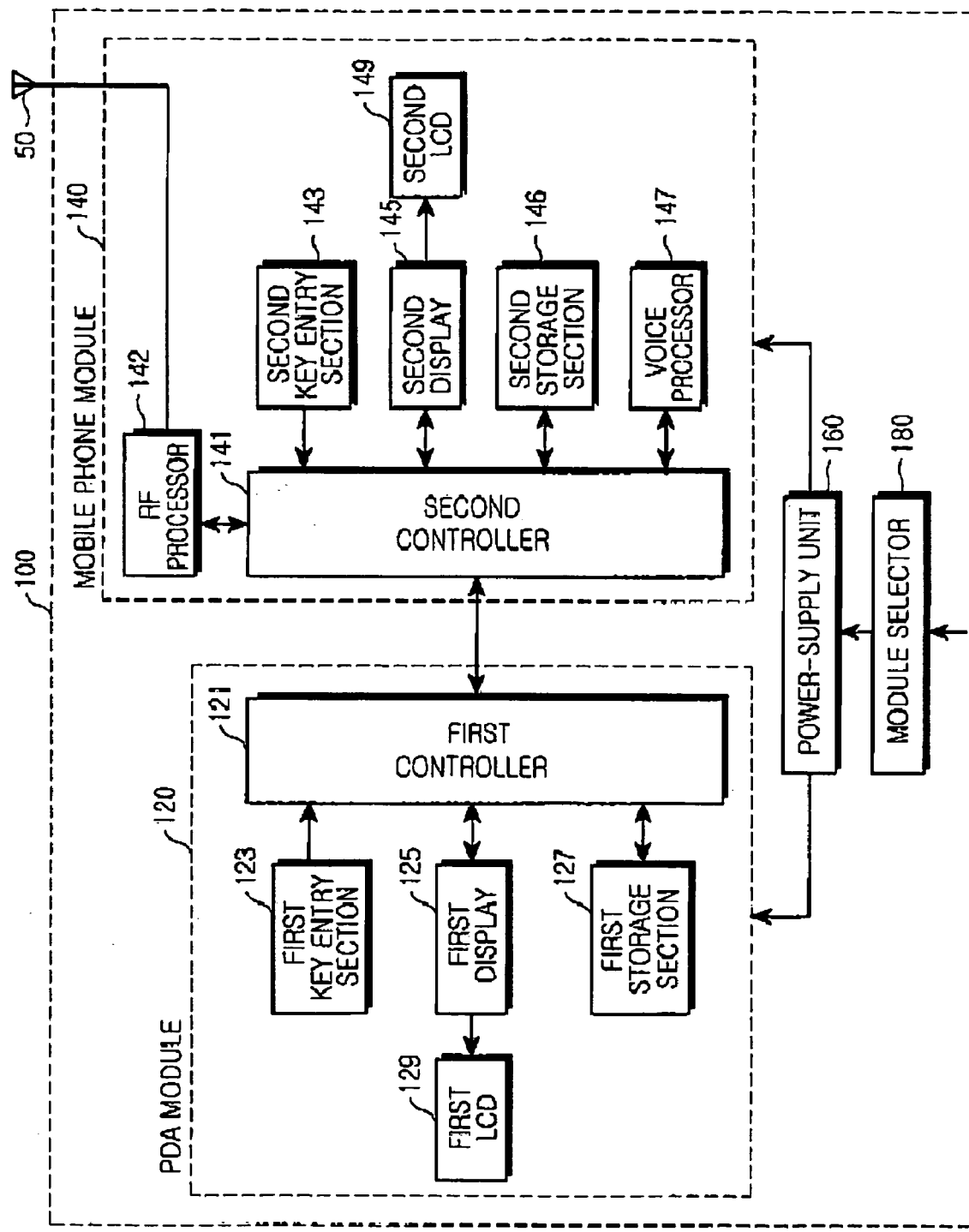
FIG. 2 is a schematic diagram of a multi-functional mobile terminal for independently operating heterogeneous devices therein in accordance with a preferred embodiment of the present invention.

FIG. 2 is a schematic diagram of a multi-functional mobile terminal for independently operating heterogeneous devices therein in accordance with a preferred embodiment of the present invention. A multi-functional mobile terminal incorporated with a mobile phone module and a PDA module in one body will hereinafter be described with reference to FIG. 2. As illustrated in FIG. 2, the multi-functional mobile terminal 100 includes a PDA module 120, a mobile phone module 140, a power-supply unit 160, and a module selector 180.

The PDA module 120 for executing personal information management functions such as a PDA functions is also called a personal information terminal module, and the mobile phone module 140 for executing a wireless phone function such as a mobile phone function is also called a mobile terminal module. The power-supply unit 160 selectively provides a power-supply voltage for either the mobile phone module 140 or the PDA module 120 according to an entry command from the module selector 180. The module selector 180 controls a power-supply operation of the power-supply unit 160 to selectively provide a power-supply voltage for either the PDA module 120 or the mobile phone module 140. Therefore, the PDA module 120 and the mobile phone module 140 each execute their operations according to the type of power-supply signals received from the power-supply unit 160 controlled by the module selector 180. In other words, the PDA module 120 and the mobile phone module 140 are activated independently of each other according to the type of power-supply voltages transmitted from the power-supply unit 160.

The PDA module 120 and the mobile phone module 140 will hereinafter be described in more detail.

The PDA module 120 includes a first controller 121, a first key entry section 123, a first display 125, a first storage section 127, and a first LCD 129. The first controller 121 controls overall operations of the PDA module 120. In addition, the first controller 121 establishes synchronization with a second controller 141 of the mobile phone module 140 according to a preferred embodiment of the present invention. If the PDA module 120 is activated on the condition that the PDA module 120 and the mobile phone module 140 are powered on, the first controller 121 controls the first display 125 to display an operation status of the PDA module 120 on the first LCD 129. Also, if the mobile phone module 140 is activated on the condition that the PDA module 120 and the mobile phone module 140 are powered on, the first controller 121 controls the first display 125 to display the module 140's operation status information received from the second controller 141 on the first LCD 129.

When the PDA module 120 is powered off and the mobile phone module 140 is powered on to activate only the mobile phone module 140 and then the PDA module 120 is powered on, the first controller 121 receives data generated by operations of the mobile phone module 140, e.g., data that has been entered or changes while the PDA module 120 was off, from a second controller 141, updates the data, and stores the updated data into the first storage section 127, thereby establishing synchronization with the second controller 141 of the mobile phone module 140.

The first key entry section 123 includes a plurality of keys for controlling both the PDA module 120 and the mobile phone module 140. In this case, if any command key for controlling the PDA module 120 is selected from among the plurality of keys and then the corresponding command enters the first controller 121, the first controller 121 controls the PDA module 120 to execute the prescribed operations corresponding to the selected command key. Also, if any command key for controlling the mobile phone module 140 is selected from among the plurality of keys and then the corresponding command enters the first controller 121, the first controller 121 transmits the selected command to the second controller 141 of the mobile phone module 140. Therefore, the second controller 141 controls the mobile phone module 140 to execute the prescribed operations corresponding to the command received from the first controller 121.

The first display 125 displays operation information of the PDA module 120 on the first LCD 129 upon receiving a control signal from the first controller 121, and displays an operation status of the mobile phone module 140 being operated by a power-supply voltage from the power-supply unit 160 on the first LCD 129. The first storage section 127 stores a plurality of programs for executing personal information management therein, and may be comprised of a RAM (Random Access Memory) or ROM (Read Only Memory), etc. The first storage section 127 stores data edited and/or added by the PDA module 120, and stores other data edited and/or added by the mobile phone module 140.

The first LCD 129 may display graphic data thereon upon receiving a control signal from the first display 125, and may display variety of indicative data accompanied with operations of the PDA module 120 and the mobile phone module 140. If the PDA module 120 and the mobile phone module 140 are powered on and then the PDA module 120 is operated, the first LCD 129 displays an operation status accompanied with operations of the PDA module 120 thereon. Also, if the PDA module 120 and the mobile phone module 140 are powered on and then the mobile phone module 140 is operated, the first LCD 129 displays an operation status accompanied with operations of the mobile phone module 140 thereon.

In addition, the mobile phone module 140 includes a second controller 141, a RF processor 142, a second key entry section 143, a second display 145, a second storage section 146, a voice processor 147, and a second LCD 149. The second controller 141 controls overall operations of the mobile phone module 140, and performs call origination and call termination operations contained in a general phone function of the mobile phone module 140. If the PDA module 120 and the mobile phone module 140 are powered on and then the mobile phone module is operated, the second controller 141 transmits operation status information of the mobile phone module 140 to the first controller 121 of the PDA module 120. Then, the first controller 121 of the PDA module 120 controls the first display 125 to display the received operation status information of the mobile phone module 140 on the first LCD 129.

The RF processor 142 converts digital signals into baseband signals, amplifies and up-converts the baseband signals, transmits the up-converted signals via an antenna 50, and converts reception signals received over the antenna 50 into digital signals in order to down-convert and amplify the reception signals. The second key entry section 143 includes a plurality of keys for selecting executable commands of the mobile phone module 140, and transmits data corresponding to a key entry signal to the second controller 141. Therefore, the second controller 141 controls the mobile phone module 140 according to a key entry signal of the second key entry section 143.

The second display 145 displays an operation status of the mobile phone module 140 according to a control signal from the second controller 141 on the second LCD 149. The second storage section 146 stores a plurality of programs for executing operations of the mobile phone module 140 therein, and may be comprised of a RAM or ROM, etc. The second storage section 146 stores data added or changed by such operations of the mobile phone module 140. The voice processor 147 demodulates reception signals received over the antenna 50 to audibly output the demodulated signals over a speaker (not shown), and processes voice signals received from a microphone (not shown) to convert the voice signals into digital signals.

If the power-supply unit 160 provides each of the PDA module 120 and the mobile phone module 140 with a power-supply voltage and the first controller 121 transmits a command for operating the mobile phone module 140, the second controller 141 controls the mobile phone module 140 to execute the prescribed operations corresponding to the received operation command. In this case, the second controller 141 transmits operation status information of the mobile phone module 140 to the first controller 121. The first controller 121 controls the first display 125 to display the operation status information of the mobile phone module 140 on the first LCD 129. In other words, when the second controller 141 receives the operation command for the mobile phone module 140 transmitted from the first controller 121 on the condition that the PDA module 120 and the mobile phone module 140 are powered on, it controls the mobile phone module 140 according to the received operation command of the mobile phone module 140, and transmits operation status information of the mobile phone module 140 to the first controller 121 so that the operation status information of the mobile phone module 140 may be displayed on the first LCD 129.

However, if the PDA module 120 is powered off and the mobile phone module 140 is powered on, the second controller 141 retrieves operation selection menus executable by only the mobile phone module 140 from the second storage section 146, and controls the second display 145 to display the retrieved selection menus on the second LCD 149. In this case, there are a variety of selection menus, such as a call origination menu for use in a phone function, a SMS (Short Message Service) menu for use in a SMS service, and a memorandum menu for recording necessary data. When the second controller 141 receives an external call signal while displaying a selection menu on the second LCD 149 in the condition in which the mobile phone module 140 executes no operation, it controls the second display 145 to display a selection menu for selecting an operation corresponding to the external call signal on the second LCD 149. There are a variety of selection menus, for example, a call reception menu for selecting/answering an incoming call signal, a call reception refusal menu for rejecting a response to the call signal, a manner mode menu for transmitting a message prescribed to the call signal to a called party, etc. In this manner, if one of many menus displayed on the second LCD 149 is enabled by a key entry operation of the second key entry section 143, the second controller 141 controls the mobile phone module 140 to execute an operation corresponding to the enabled menu.

If the power-supply unit 160 again provides the PDA module 120 with a power-supply voltage according to a control signal of the module selector 180 in the condition in which only the mobile phone module 140 and not the PDA module 120 has been powered on, then the first controller 121 initializes operations of the PDA module 120. In this case, the second controller 141 transmits to the first controller 121 any updated data information previously generated by operations of the mobile phone module 140 while the PDA module 120 was in a powered-off state. Therefore, the first controller 121 stores the updated data information transmitted from the second controller 141 in the first storage section 127, and establishes synchronization with the mobile phone module 140.

By establishing synchronization with the mobile phone module 140, the first controller 121 controls the mobile phone module 140 and the PDA module 120 at the same time.

Figure 3:
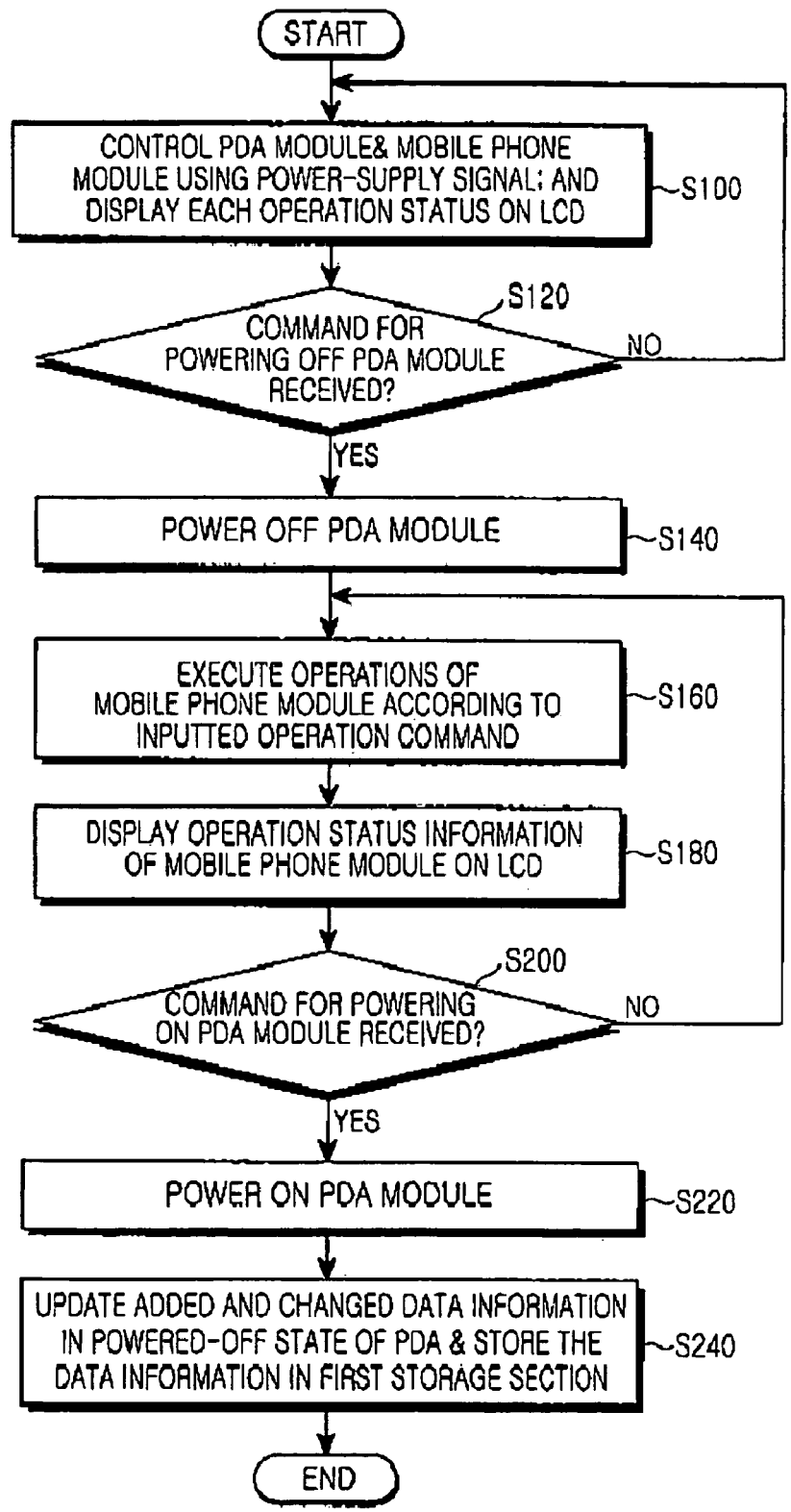
FIG. 3 is a flow chart illustrating a procedure for independently controlling operations of a multi-functional mobile terminal in accordance with a preferred embodiment of the present invention.

FIG. 3 is a flow chart illustrating a procedure for independently controlling operations of a multi-functional mobile terminal in accordance with a preferred embodiment of the present invention. Referring to FIG. 3, the first controller 121 controls the PDA module 120 and the mobile phone module 140 at the same time upon receiving a power-supply voltage from the power-supply unit 160, and controls the first display 125 to display each operation status on the first LCD 129 at step S1 The power-supply unit 160 determines at step S120 whether the module selector 180 has generated a prescribed command for powering off the PDA module 120 according to a user's key entry signal in the condition in which the PDA module 120 and the mobile phone module 140 have been powered on. If it is determined that the module selector 180 has generated such a prescribed command for powering off the PDA module 120, the power-supply unit 160 powers off the PDA module 120 at step S140 while maintaining power to the mobile phone module 140.

When the second controller 141 receives the operation command for the mobile phone module 140 from the second key entry section 143 under conditions in which the PDA module 120 is powered off, it controls the mobile phone module 140 to execute a corresponding operation of the received operation command at step S160. While the mobile phone module 140 executes the corresponding operation according to the received operation command from the second key entry section 143, the second controller 141 controls the second display 145 to display operation status information accompanied with operations of the mobile phone module 140 at step S180.

While the mobile phone module 140 executes a corresponding operation in a powered-off state of the PDA module 120, the power-supply unit 160 determines at step S200 whether the module selector 180 generates a prescribed command for powering on again the PDA module 120. If it is determined at step S200 that the power-supply unit 160 receives the prescribed command for powering on again the PDA module 120, the PDA module 120 is powered on again at step S220. When the PDA module 120 is powered on again, the second controller 141 transmits to the first controller 121 of the PDA module 120 update data, i.e., added and/or changed data information, generated by operations previously executed in the mobile phone module 140 in a powered-off state of the PDA module 120. Therefore, the first controller 121 updates the added and/or changed data information of the mobile phone module 140, and stores the updated data information in the first storage section 127 at step S240. By the aforementioned operations, the PDA module 120 and the mobile phone module 140 are synchronized with each other.

If the PDA module 120 is powered on again, the first controller 121 controls the PDA module 120 and the mobile phone module 140 at the same time.

Therefore, the mobile phone module 140 may independently execute a corresponding operation in a powered-off state of the PDA module 120, and displays status information of the executed operation on the second LCD 149 mounted on the mobile phone module 140, so that the mobile phone module 140 can indicate its own operation and status information thereon. Also, the PDA module 120 and the mobile phone module 140 independently execute their own operations, and display current status information of their operations on their own LCDs, respectively, so that the user may power off a power-supply voltage transmitted to an unused module from among the PDA module 120 and the mobile phone module 140, thereby reducing power consumption.

Figure 4:
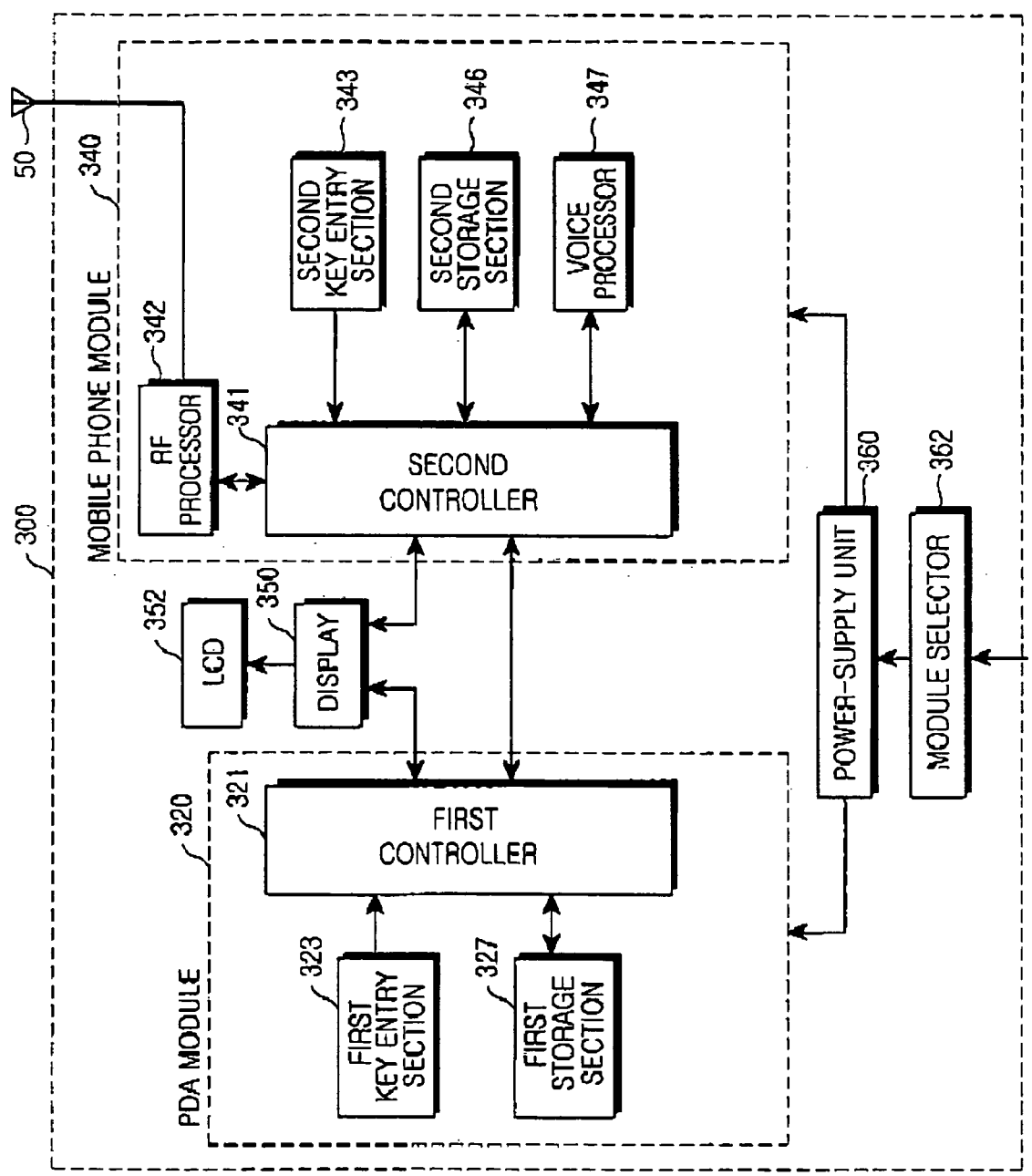
FIG. 4 is a view illustrating a schematic diagram of a multi-functional mobile terminal for independently operating heterogeneous devices therein in accordance with another preferred embodiment of the present invention.

FIG. 4 is a schematic diagram of a multi-functional mobile terminal for independently operating heterogeneous devices therein in accordance with another preferred embodiment of the present invention. Referring to FIG. 4, a multi-functional mobile terminal 300 includes a PDA module 320, a mobile phone module 340, a display 350, a power-supply unit 360, a module selector 362, and an LCD 352. The multi-functional mobile terminal 300 illustrated in FIG. 4 includes only one LCD 352 for displaying its operation status information, whereas the multi-functional mobile terminal 100 shown in FIG. 2 includes first and second LCDs 129 and 149, where the first LCD 129 is adapted to display all the operations of the PDA module 120 and the mobile phone module 140 and the second LCD 149 is adapted to display operations of only the mobile phone module 140 in a powered-off state of the PDA module 120 in FIG. 2

The PDA module 320 for executing personal information management functions such as PDA functions is also called a personal information terminal module, and the mobile phone module 340 for executing wireless phone functions such as mobile phone functions is also called a mobile terminal module. The display 350 displays operation status information of the PDA module 320 and the mobile phone module 340 on the LCD 352. The power-supply unit 360 selectively provides a power-supply voltage for either the PDA module 320 or the mobile phone module 340 according to an entry command from the module selector 362. The module selector 362 controls a power-supply operation of the power-supply unit 360 to selectively provide a power-supply voltage for either the PDA module 320 or the mobile phone module 340. In this way, the PDA module 320 and the mobile phone module 340 each execute their operations according to the type of power-supply voltages received from the power-supply unit 360 controlled by the module selector 362. In other words, the PDA module 320 and the mobile phone module 340 respectively execute independent operations using each power-supply voltage received from the power-supply unit 360.

The PDA module 320 includes a first controller 321, a first key entry section 323, and a first display 327. The first controller 321 controls overall operations of the PDA module 320. Also, the first controller 321 establishes synchronization with a second controller 341 of the mobile phone module 340 according to a preferred embodiment of the present invention. If the PDA module 320 is activated on the condition that the PDA module 320 and the mobile phone module 340 are powered on, then the first controller 321 controls the display 350 to display an operation status of the PDA module 320 on the LCD 352. Also, if the mobile phone module 340 is activated on the condition that the PDA module 320 and the mobile phone module 340 are powered on, then the first controller 321 controls the display 350 to display the operation status information for the mobile phone module 340 received from the second controller 341 on the LCD 352.

When the PDA module 320 is powered off and only the mobile phone module 340 has been powered on, and then the PDA module 320 is powered on, the first controller 321 update data generated by operations of the mobile phone module 340 from the second controller 341, updates any changed and/or added data, and stores the updated data into the first storage section 327, thereby establishing synchronization with the mobile phone module 340.

The first key entry section 323 includes a plurality of keys for controlling both the PDA module 320 and the mobile phone module 340. In this case, if any command key for controlling the PDA module 320 is selected from among the plurality of keys and then the corresponding command enters the first controller 321, the first controller 321 controls the PDA module 320 to execute the prescribed operations corresponding to the selected command key. Also, if any command key for controlling the mobile phone module 340 is selected from among the plurality of keys and then the corresponding command enters the first controller 321, the first controller 321 transmits the selected command to the second controller 341 of the mobile phone module 340. Therefore, the second controller 341 controls the mobile phone module 340 to execute the prescribed operations corresponding to the command received from the first controller 321.

The display 350 displays operation information of the PDA module 320 on the LCD 352 upon receiving a control signal from the first controller 321, and displays an operation status of the mobile phone module 340 being operated by a power-supply voltage from the power-supply unit 360 on the LCD 352. The first storage section 327 stores a plurality of programs for executing personal information management therein and may be comprised of a RAM or ROM, etc. The first storage section 327 stores update data, i.e., data edited and/or added by the PDA module 320, and stores other data edited and/or added by the mobile phone module 340.

If the PDA module 320 and the mobile phone module 340 are powered on and then the PDA module 320 is operated, the LCD 352 displays operation status information accompanied with operations of the PDA module 320 thereon. Also, if the PDA module 320 and the mobile phone module 340 are powered on and then the mobile phone module 340 is operated, the LCD 352 displays operation status information accompanied with operations of the mobile phone module 340 thereon.

In addition, the mobile phone module 340 includes a second controller 341, a RF processor 342, a second key entry section 343, a second storage section 346, and a voice processor 347. The second controller 341, the RF processor 342, the second key entry section 343, the second storage section 346, and the voice processor 347 are the same as the second controller 141, the RF processor 142, the second key entry section 143, the second storage section 146, and the voice processor 147, respectively, such that their detailed description will be omitted below.

If the power-supply unit 360 provides the PDA module 320 and the mobile phone module 340 with a power-supply voltage and the first controller 321 transmits a command for operating the mobile phone module 340, the second controller 341 controls the mobile phone module 340 to execute prescribed operations corresponding to the command received from the first controller 321. On the other hand, if the power-supply unit 360 provides the PDA module 320 and the mobile phone module 340 with a power-supply voltage and then the PDA module 320 is powered off, the second controller 341 controls the mobile phone module 340 to execute prescribed operations corresponding to an entry command received from the second key entry section 343. In this case, the second controller 341 controls the display 350 to display operation status information of the mobile phone module 340 on the LCD 352.

If the power-supply unit 160 again provides the PDA module 320 with a power-supply voltage according to a control signal of the module selector 362 on the condition that only the mobile phone module 340 and not the PDA module 320 is powered on, then the first controller 321 initializes operations of the PDA module 320. In this case, the second controller 341 transmits to the first controller 321 update data information previously generated by operations of the mobile phone module 340 in a powered-off state of the PDA module 320. Therefore, the first controller 321 stores the update data information received from the second controller 341 in the first storage section 327, and establishes synchronization with the mobile phone module 340.

By establishing synchronization with the mobile phone module 340, the first controller 321 controls the mobile phone module 340 and the PDA module 320 at the same time. Therefore, the first controller 321 controls the display 350 to display operation status information of the mobile phone module 340 and the PDA module 320 on the LCD 352.

Figure 5:
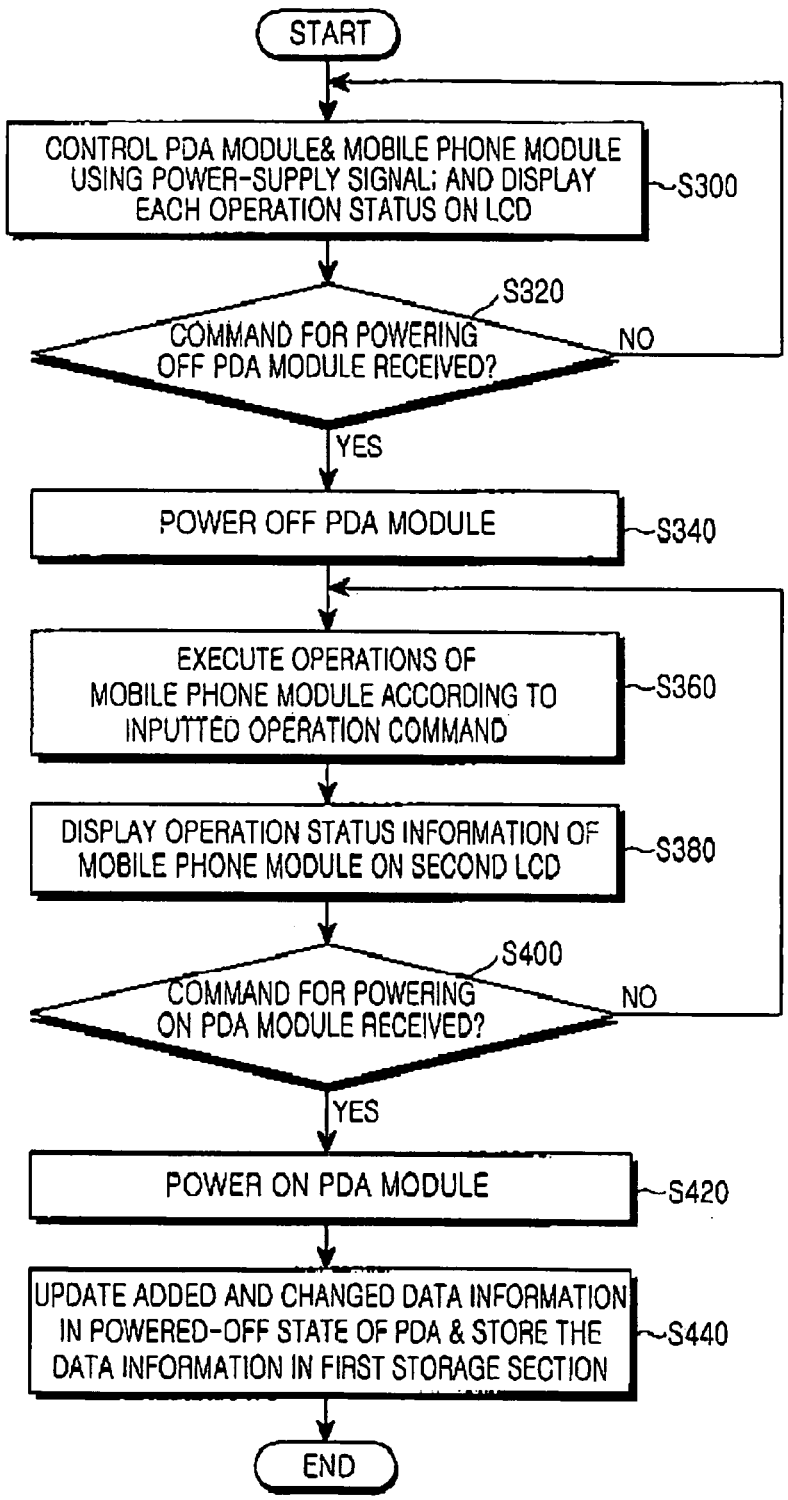
FIG. 5 is a flow chart illustrating a procedure for independently controlling operations of a multi-functional mobile terminal in accordance with another preferred embodiment of the present invention.

FIG. 5 is a flow chart illustrating a procedure for independently controlling operations of a multi-functional mobile terminal in accordance with another preferred embodiment of the present invention. Referring to FIG. 5, the first controller 321 controls the PDA module 320 and the mobile phone module 340 at the same time using a power-supply voltage received from the power-supply unit 360, and controls the display 350 to display each operation status on the LCD 352 at step S300.

The power-supply unit 360 determines at step S320 whether the module selector 362 generates a prescribed command for powering off the PDA module 320 in the condition in which the PDA module 320 and the mobile phone module 140 have been powered on. If it is determined at step S320 that the module selector 362 transmits the prescribed command for powering off the PDA module 320 to the power-supply unit 360, the power-supply unit 360 powers off the PDA module 320 at step S340.

When the second controller 341 receives the operation command for the mobile phone module 340 from the second key entry section 343 in the condition in which the PDA module 320 has been powered off, it controls the mobile phone module 340 to execute a corresponding operation of the received operation command at step S360. In this case, the second controller 341 controls the display 350 to display operation status information of the mobile phone module 340 on the LCD 352 at step S380.

While the mobile phone module 340 executes the corresponding operation according to the received operation command from the second key entry section 343 in a powered-off state of the PDA module 320, the power-supply unit 360 determines at step S400 whether the module selector 362 generates a prescribed command for again providing the PDA module 320 with a power-supply voltage. If it is determined at step S420 that the power-supply unit 360 has received the prescribed command for powering on again the PDA module 320 from the module selector 362, the PDA module 320 is powered on again at step S420.

In this case, if the PDA module 320 is powered on again at step S420, the second controller 341 transmits to the first controller 321 of the PDA module 320 update data, i.e., added and/or changed data information generated by operations previously executed in the mobile phone module 340 in a powered-off state of the PDA module 320. Therefore, the first controller 321 receives the added and/or changed data information of the mobile phone module 340 from the second controller 341, updates the received data information at step S440, and stores the updated data information in the first storage section 327. If the PDA module 320 is powered on again, the first controller 321 controls the PDA module 320 and the mobile phone module 340 at the same time.

As described above, the mobile phone module 340 independently executes its operation in a powered-off state of the PDA module 320, and displays status information of the executed operation on the LCD 352, such that the mobile phone module 340 can display its own operation and status information on the LCD 352.

Hereinafter, the detailed description for an access method in an external storing media connected to each module of multi-functional mobile terminal comprising a PDA module and a mobile phone module will be given. Herein, the access method in the external storing media can be applied identically to the first embodiment (FIG. 2) and the second embodiment (FIG. 4) of the present invention and thus, the reference numbers used in FIG. 2 are identically used for explanation.

If the PDA module 120 is connected to an external storing media, the PDA module accesses to the external storing media in accordance with an inputted access signal and reads/writes a corresponding data. And then, the read data is stored in a first storage section 127.

The mobile phone module 140 can be activated independently with the PDA module 120. If the mobile phone module 140 is connected to an external storing media, the mobile phone module 140 accesses to the external storing media in accordance with an inputted access signal and reads/writes a corresponding data. The read data is transmitted to the PDA module 120. The PDA module 120 stores the received data to the first storage section 127.

If the PDA mode 120 is powered off, the mobile phone module 140 stores the read data to a second storage section 146. If the PDA module 120 is again powered on, the mobile phone module 140 transmits the data, which is read from the external storing media during the power-off state of the PDA module 120 and stored in the second storage section, to the PDA module 120. The PDA module 120 stores the received data to the first storage section 127.

Accordingly, during the power-off state of the PDA module 120, the mobile phone module accesses individually to an external storing media and reads/writes the corresponding data. If the PDA module 120 is again powered on, the mobile phone module 140 updates the data, which is read during the power-off state of the PDA module 120, to the PDA module 120. Thus, the present invention can access independently to an external storing media connected to each module in a multi-functional mobile terminal having the different process.

Although the above-description mentions an independent access method of each module to the external storing media connected to the PDA module 120 and the mobile phone module 140, it is also possible to exchange a data by independently accessing each module to any external devices, besides the external storing media.

As is apparent from the above description, the mobile phone module independently executes its own operations in a powered-off state of the PDA module, and displays status information of the executed operations on its own LCD, so that self-operation and operation status information can be displayed using only the mobile phone module. Also, the PDA module and the mobile phone module independently execute their own operations, and display current status information of their executed operations on their own LCDs, respectively, so that a user may power off a power-supply voltage transmitted to an unused module from among the PDA module and the mobile phone module, thereby reducing power consumption.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-functional mobile terminal providing a phone function, comprising:
   a power-supply unit for selectively providing a power-supply signal to a corresponding module according to a power-supply entry signal;
   a personal information terminal module including a first display for controlling the first display to display status information of an executed operation according to an entry command using a power-supply signal received from the power-supply unit;
   a mobile terminal module including a second display for executing a corresponding operation according to a prescribed command after receiving the prescribed command from the personal information terminal module using a power-supply signal received from the power-supply unit, and displaying operating status information on the first display when the personal information terminal module is in a powered-on state, and displaying the operating status information on the second display when the personal information terminal module is in a powered-off state; and
   a module selector positioned separate from the personal information terminal module and the mobile terminal module, for controlling a power-supply operation of the power-supply unit to selectively provide the power-supply signal to at least one of the personal information terminal module and the mobile terminal module.

2. The multi-functional mobile terminal as set forth in claim 1, wherein the mobile terminal module transmits update data created by operations of the mobile terminal module while the personal information module is in a powered-off state, to the personal information module in order to be stored therein, when the personal information module is powered on.

3. The multi-functional mobile terminal as set forth in claim 2, wherein the mobile terminal module includes a command entry section for entering a prescribed command to independently operate the mobile terminal module when the personal information terminal module is in powered-off state, and the second display displays operation status information of the mobile terminal module according to input signal when the signal is input from the command entry section.

4. The multi-functional mobile terminal as set forth in claim 1, wherein the personal information terminal module is a PDA (Personal Digital Assistant) module.

5. The multi-functional mobile terminal as set forth in claim 1, wherein, the mobile terminal module is a mobile phone module.

6. A multi-functional mobile terminal providing a phone function, comprising:
   a power-supply unit for selectively providing an external power-supply signal to a corresponding device according to an entry signal;
   a display for displaying operation status information on at least one of devices executing an operation corresponding to an entry command using the power-supply signal received from the power-supply unit;
   a personal information terminal module for executing a corresponding operation using a power-supply signal received from the power-supply unit, displaying operation status information received and self-operation status information on the display;
   a mobile terminal module for executing an operation corresponding to an inputted command using the power-supply signal received from the power-supply unit outputting operation status information of the executed operation to personal information terminal module, and displaying self-operation status information on the display when the personal information terminal module is in a powered-off state; and
   a module selector positioned separate from the personal information terminal module and the mobile terminal module, for controlling a power-supply operation of the power-supply unit to selectively provide the power-supply signal for either the personal information terminal module or the mobile terminal module.

7. The multi-functional mobile terminal as set forth in claim 6, wherein the mobile terminal module transmits update data created by operations of the mobile terminal module while the personal information module is in a powered-off state, to the personal information module in order to be stored therein, when the personal information module is powered on.

8. The multi-functional mobile terminal as set forth in claim 6, wherein the mobile terminal module includes a command entry section for entering a prescribed command to independently operate the mobile terminal module when the personal information terminal module is in a powered-off state, and if the command entry section is selected, then the mobile terminal module displays operation status information of the mobile terminal module on the display according to a command signal selected by the command entry section.

9. The multi-functional mobile terminal as set forth in claim 6, wherein the personal information terminal module is a PDA (Personal Digital Assistant) module.

10. The multi-functional mobile terminal as set forth in claim 6, wherein the mobile terminal module is a mobile phone module.

11. A method for controlling independent operations using a multi-functional mobile terminal incorporated with a personal information terminal module and a mobile terminal module in one body in which the personal information terminal module and the mobile terminal module respectively receive a power-supply signal for executing independent operations, said method comprising the steps of:

if the power-supply signal is applied to both the personal information terminal module and the mobile terminal module, determining whether a command for powering off the personal information terminal module is received from a module selector positioned separate from the personal information terminal module and the mobile terminal module;

if the command for powering off the personal information terminal module is received from the module selector, powering off the personal information terminal module;

executing a corresponding operation of the mobile terminal module according to an entry command in a powered-off state of the personal information terminal module, and displaying operation status information accompanied with the executed operation of the mobile terminal module;

if the mobile terminal module is independently operated, determining whether a command for powering on the personal information terminal module is received from the module selector; and if the command for powering on the personal information terminal is received from the module selector, powering on the personal information module.

12. The method as set forth in claim 11, further comprising the step of:

updating data changed by operations of the mobile terminal module in a powered-off state of the personal information terminal module, and storing the updated data in the personal information terminal module.

13. The method as set forth in claim 12, wherein the personal information terminal module is a PDA (Personal Digital Assistant) module.

14. The method as set forth in claim 13, wherein the mobile terminal module is a mobile phone module.

15. A multi-functional mobile terminal having different processes, comprising:

a main module for accessing an external device and exchanging corresponding data if an access signal to the external device connected using input power is input; and a sub-module independently activated with the main module using the input power, for accessing the external device and exchanging corresponding data if the access signal to the external device is input, transmitting the data to the main module, and storing the data by itself if the main module is powered off.

16. The multi-functional mobile terminal as set forth in claim 15, wherein the sub-module updates the data, which is accessed from the external device during the power-off state of the main mobile, to the main module if the main module is again powered on.

17. The multi-functional mobile terminal as set forth in claim 15, wherein the main module is a PDA (Personal Digital Assistant) module.

18. The multi-functional mobile terminal as set forth in claim 15, wherein the sub-module is a mobile phone module.

19. The multi-functional mobile terminal as set forth in claim 15, wherein the external device is an external storing media.

* * * * *